Sept. 27, 1960 S. CHAMBERS 2,953,868
DEVICE FOR SAFELY ADMINISTERING POISON
TO INSECTS, RODENTS AND THE LIKE
Filed Dec. 1, 1959

INVENTOR.
STEVEN CHAMBERS
BY Richards & Geier
ATTORNEYS

United States Patent Office 2,953,868
Patented Sept. 27, 1960

2,953,868

DEVICE FOR SAFELY ADMINISTERING POISON TO INSECTS, RODENTS AND THE LIKE

Steven Chambers, P.O. Box 81, Fort Myers, Fla.

Filed Dec. 1, 1959, Ser. No. 856,486

4 Claims. (Cl. 43—131)

This invention relates to a device for administering poison to insects, rodents and the like, and refers, more particularly to a device for safely administering poisons to insects and rodents without endangering the lives of children and domestic animals.

Devices known in prior art for poisoning roaches, mice, etc., are likely to endanger the lives and well-being of curious children and domestic animals. Some of the devices are in the form of tubes having open ends, or boxes and containers having openings therein, whereby curious children or animals may easily reach the poison. Other prior art devices, which make it more difficult for children to reach the poison, have the disadvantage that in so doing the device becomes ineffective because its construction also makes it very difficult for insects, rodents and the like to enter the device and reach the poison. Other devices have movable parts to block the entrance to the poison, but again this makes it difficult for the insects to reach the poison but hardly taxes the ingenuity of the average child. There are, of course, prior art devices not utilizing edible poisons at all, but utilizing electrical and other means for killing undesirable insects. Of course, these latter devices are extremely expensive and are impractical for use in homes, stores, and warehouses.

An object of the present invention is to provide a device for safely administering poison to insects and rodents without endangering curious children and domestic animals and not having the disadvantages of prior art.

Another object is to provide a device which will efficiently allow insects and rodents to enter and approach the poison disposed therein.

Another object is to provide an insect and rodent poisoning device so constructed that children and domestic animals cannot get at the poison while still allowing easy entrance for insects and rodents.

Another object is to provide an insect and rodent poisoning device which will not contaminate the place where it is disposed, such as a kitchen, and which will not be offensive to the esthetic sensibilities of human beings.

A further object is the provision of an insect and rodent poisoning device which is easy and inexpensive to manufacture and which can, therefore, be utilized on a large scale wherever needed.

Other objects of the present invention will become apparent in the course of the following specification.

The objects of the present invention may be realized by providing a device for administering poison to insects and rodents with means for denying access to the poison to curious children and domestic animals, while allowing insects and rodents to easily reach the poison.

The present device comprises a poison carrying base portion to which is connected a protective cover. An opening between the base and protective cover is constructed in such a manner that insects and rodents may enter the device to eat the poison while children will find it impossible to get at the poison.

The invention will appear more clearly from the following detailed description when taken in connection with the accompanying drawing showing, by way of example, preferred embodiments of the inventive idea.

Figure 1:
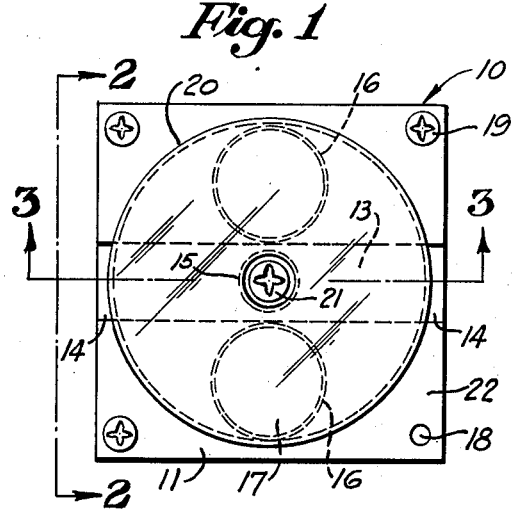
Figure 1 is a top view of a safety poisoning device of the present invention.
Figure 3:
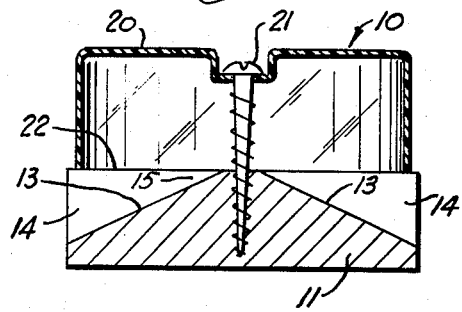
Figure 3 is a sectional view taken along line 3—3 of Figure 1.
Figure 2:
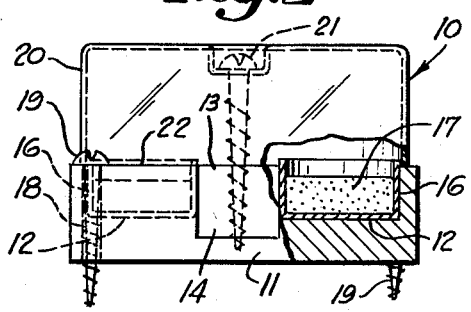
Figure 2 is an end view taken along line 2—2 of Figure 1.

A poison administering device 10 of the present invention is shown in Figs. 1, 2 and 3 and comprises a base portion 11 having two circular recesses 12 and a sloped slot 13. The sloped slot 13 is deeper at the edges 14 of base portion 11 than it is at the middle 15 of base portion 11. Removable containers 16 may be placed in the circular recesses 12 and poison 17 is disposed in the containers 16. Holes 18 may be placed in the base 11 for receiving screws 19, or other fastening devices, in order to securely fasten the device 10 to a floor or wall. A protective cover 20 of a diameter less than the width of the base, but large enough so as to form a cover above the containers 16, is removably, but securely, fastened to the base 11 by means of a fastening device such as screw 21. The screw 21 or other fastening means should be such that it would be extremely difficult for a child to remove the cover under any circumstances. The screws 21 may be Phillips-head screws, and may be recessed in the protective cover 20 so that it would be necessary for a child to have a special Phillips-head screw driver before the protective cover could be removed.

The entire device 10 may be made out of almost any material. However, plastic is believed to be best for the base 11 and poison containers 16 because of the ease of manufacture and cleaning. Metal may also be used for the containers 16 if desired. The protective cover 20 should preferably be made out of a strong, transparent, plastic so that the effectiveness of the device 10 may be visually observed from time to time.

The manner of operation and use of the poison administering device 10 of the present invention is as follows:

The base 11, if desired, may be securely connected to the floor or other surface by means of screws 19. The poison 17 may then be disposed in the recesses 12, but preferably should be disposed in containers 16 which removably fit in recesses 12 in order to facilitate cleaning the device 10. After the poison 17 has been placed in the device 10, the protective cover 20 is placed with its perimeter in contact with the upper surface 22 of base 11, so that the protective cover 20 is in contact with upper surface 22 at all points except where the protective cover 20 passes over the sloped slot 13. The screw 21, or other fastening means, is used to securely fasten the protective cover to the base 11. Insects, or rodents, in the vicinity of the poison administering device 10 will become aware of the poison 17 and will enter the device through the sloped slot 13 at the edges 14 of base 11. The insect will then travel up the slot 13 toward the middle portion 15 which is on approximately the same level as the upper surface 22. The insect then travels to the container 16 and partakes of the poison 17, whereupon it will reach its demise.

Curious children and domestic animals cannot get at the poison because the protective cover 20 cannot be removed without the use of a special tool in order to remove the Phillips-head screw 21. They cannot turn the device upside-down to jiggle out the poison, since the device is screwed to the floor. Neither can the children reach the poison 17 with their fingers since the only entrance to the interior of the device 10 is by means of the sloped slot 13. Thus, in an attempt to reach the poison 17, the children would have to place their fingers in the end of sloped slot 13, bend their fingers upwardly to reach the upper surface 22 and then bend their fingers downwardly to reach the poison 17. This cannot be done due to the construction of the present device 10. The poison containers 16 are at such a distance from the edge 14 that it is impossible for anyone, man, woman, or child to reach the poison 17 with their fingers. The sloped slot prevents a person ever from sticking his fingers in the vicinity of the containers 16. It is further impossible, because of the slope of the slot 13, to stick a straight object, such as a pencil, through the opening of sloped slot 13 at edge 14 and come in contact wtih the poison. Because of the present construction, a straight object placed through the opening can never contact the poison 17. It is thus seen that the present device 10 may be used with complete safety even when there are small children and domestic animals in the household.

Figure 4:
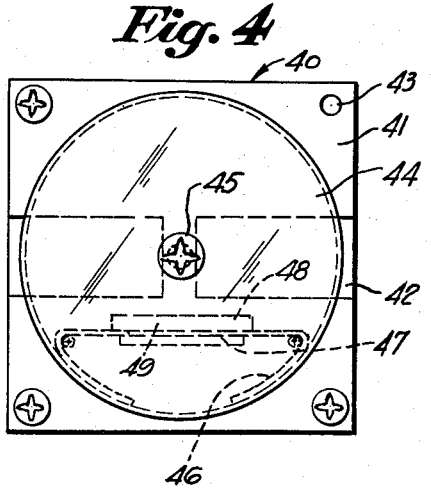
Figure 4 is a front view of another embodiment of the present invention.

Another embodiment 40 of the present invention is shown in Fig. 4. The embodiment 40 is similar in construction to embodiment 10 except that embodiment 40 is meant primarily to be fastened to vertical surfaces such as walls. The embodiment 40 comprises a base 41, a sloped slot 42, screw openings 43 for connecting the base to a vertical surface, a protective cover 44 which is connected to the base 41 by a means of a Phillips-head screw 45. A platform 46 with a recess 47 for holding a container 48 and poison 49 is connected by fastening means to the base 41 in such a manner that the poison container 48 is vertically disposed and completely protected by the protective cover 44. The platform 46, if desired, may be connected to the inside of the protective cover 44 by means of adhesive or the like. The manner of constructing and using the embodiment 40 is similar to that of device 10. The embodiments 10 and 40 can be combined into one device if desired.

Figure 5:
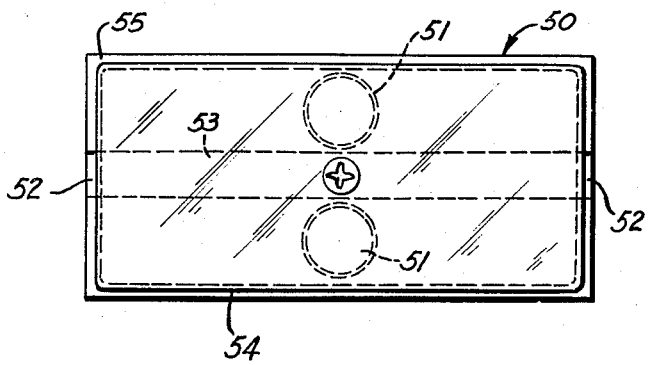
Figure 5 is a top view of still another embodiment of the present invention.

If it is desired to poison large rodents, it will, of course, be necessary to make the entrance to the device somewhat larger than for smaller insects or rodents. An embodiment 50 of the present device is shown in Fig. 5 and can be used for poisoning larger size rodents. The embodiment 50 is similar to device 10, except that embodiment 50 is made longer so that the poison containers 51 are far removed from the openings 52 of the sloped slot 53. The protective cover 54 is connected to the base 55, as described above, and although the space under the protective cover 54 at the opening 52 is larger than in the previously described embodiments, it is still impossible for children or domestic animals to reach the poison in containers 51 because of the sloped slot 53 and because of the large distance between the opening 52 and containers 51. Otherwise the manner of construction and use of embodiment 50 is similar to that of device 10.

Among the advantages of the poison administering device of the present invention are the following: the device allows insects and rodents to reach the poison without difficulty; small children and domestic animals can never reach the poison; the poison is at all times easily controlled and will not contaminate the place where the device is placed; and the device is easy and inexpensive to manufacture. It should be further noted that the simplicity of construction of the present device, which allows easy entrance of insects and rodents but which prevents entrance of children and domestic animals, is of the essence in the present invention. The simple construction makes the device inexpensive to purchase, and it should be kept in mind that those persons and households having the greatest need for insect and rodent control are most likely to be those least able to afford intricate, expensive devices for this purpose, and wherein the children are least likely to be sufficiently aware of the dangers of poison. A safe, inexpensive method of administering poison to insects and rodents in such a situation is an absolute necessity.

It is apparent that the described examples are capable of many variations and modifications within the scope of the present invention. All such variations and modifications are to be included within the scope of the present invention.

What is claimed is:

1. A device for administering poison to insects, rodents, and the like, comprising a base portion having an upper surface, said base portion having a sloped slot extending from the edge of said base portion toward the vicinity of the middle of said base portion, said slot being shallower in the vicinity of the middle of said base portion and deeper at the edge of said base portion, said base portion comprising means for containing the poison; a protective cover in contact with said upper surface along the perimeter of said cover, said means for containing poison being disposed entirely within the perimeter of said cover, whereby said poison may be reached only by a path along said slot, and means securely connecting said cover to said base.

2. A device for administering poison to insects, rodents, and the like, comprising a base portion having an upper surface, said base portion having a sloped slot extending entirely across said upper surface, said slot being shallower in the vicinity of the middle of said base portion and deeper at the edges of said base portion, said upper surface having a recess for containing poison, a protective cover in contact with said upper surface along the perimeter of said cover, said recess for containing poison being disposed entirely within the perimeter of said cover, whereby said poison may be reached only by a path along said slot, and means securely connecting said cover to said base.

3. A device for administering poison to insects, rodents, and the like, comprising a base portion having an upper surface, said base portion having a sloped slot extending from the edge of said base portion toward the vicinity of the middle of said base portion, said slot being shallower in the vicinity of the middle of said base portion and deeper at the edge of said base portion, a platform connected to said base portion substantially parallel to said slot and normal to said upper surface, said platform comprising means for containing poison; a protective cover in contact with said upper surface along the perimeter of said cover, said platform and said means for containing poison disposed entirely within the perimeter of said cover, whereby said poison may be reached only by a path along said slot, and means securely connecting said cover to said base.

4. A device for administering poison to insects, rodents, and the like, comprising a base portion having an upper surface, said base portion having a sloped slot extending from the edge of said base portion toward the vicinity of the middle of said base portion, said slot being shallower in the vicinity of the middle of said base portion and deeper at the edge of said base portion, a protective cover in contact with said upper surface along the perimeter of said cover, a platform connected to said cover and disposed between said cover and said base portion, said platform being substantially parallel to said slot and normal and adjacent to said upper surface, said platform comprising means for containing poison; said means for containing poison being reached only by a path along said slot, and means securely connecting said cover to said base.

References Cited in the file of this patent

UNITED STATES PATENTS

| | | |
|---|---|---|
| D. 128,787 | Nelson | Aug. 12, 1941 |
| 1,887,771 | Marsh | Nov. 15, 1932 |
| 2,750,707 | Ekstedt | June 19, 1956 |